(12) United States Patent
Richards

(10) Patent No.: US 7,047,888 B2
(45) Date of Patent: May 23, 2006

(54) TRANSIT SYSTEM

(76) Inventor: Bryan Richards, 3285 No. Brookside Dr., Provo, UT (US) 84604

( * ) Notice: Subject to any disclaimer, the term of this patent is extended or adjusted under 35 U.S.C. 154(b) by 0 days.

(21) Appl. No.: 10/645,144

(22) Filed: Aug. 20, 2003

(65) Prior Publication Data
US 2004/0035315 A1   Feb. 26, 2004

Related U.S. Application Data

(63) Continuation-in-part of application No. 10/225,225, filed on Aug. 21, 2002, now Pat. No. 6,668,729.

(51) Int. Cl.
*B61B 1/02*   (2006.01)
(52) U.S. Cl. .................. 104/28; 104/27; 104/88.02
(58) Field of Classification Search .................. 104/27, 104/28, 30, 88.02, 124, 125, 167, 53, 139, 104/138.1; 105/238.1, 396
See application file for complete search history.

(56) References Cited

U.S. PATENT DOCUMENTS

| | | | |
|---|---|---|---|
| 2,285,933 A * | 6/1942 | Ledwinka et al. .......... 105/340 |
| 3,593,262 A | 7/1971 | Spencer | |
| 3,675,584 A * | 7/1972 | Hall .............................. 104/28 |
| 3,954,064 A * | 5/1976 | Minovitch ................ 104/138.1 |
| 4,023,753 A * | 5/1977 | Dobler ........................... 246/5 |
| 4,069,888 A | 1/1978 | Wolters et al. | |
| 5,168,451 A | 12/1992 | Bolger | |
| 5,760,709 A | 6/1998 | Hayashi | |
| 5,799,263 A | 8/1998 | Culbertson | |
| 5,962,833 A | 10/1999 | Hayashi | |
| 6,263,799 B1 * | 7/2001 | Pardes .......................... 104/28 |
| 6,658,392 B1 | 12/2003 | Yoshida | |
| 2003/0094116 A1 * | 5/2003 | Santti et al. ................. 105/396 |

FOREIGN PATENT DOCUMENTS

JP   11351893 A  * 12/1999

* cited by examiner

*Primary Examiner*—Frantz F. Jules
(74) *Attorney, Agent, or Firm*—David R. McKinney

(57) ABSTRACT

A point-to-point transit system for riders includes an elongate guideway, a plurality of autonomous vehicles disposed in the guideway, a plurality of selectively actuable rider access portals in the side of the guideway, and a control system, configured to automatically guide the vehicles within the guideway. The rider access portals are configured to allow ingress and egress of riders to the autonomous vehicles in the guideway. The control system is configured to allow each vehicle to travel between origin and destination locations that are independently selected by a rider.

17 Claims, 12 Drawing Sheets

TRANSIT SYSTEM

This application is a continuation-in-part of U.S. patent application Ser. No. 10/225,225, filed on Aug. 21, 2002 now U.S. Pat. No. 6,668,729 and entitled TRANSIT SYSTEM.

BACKGROUND OF THE INVENTION

1. Field of the Invention

The present invention relates generally to rapid transit systems. More particularly, the present invention relates to a transit system that combines multiple independent vehicles into controllably linked high speed "trains" on an enclosed guideway, and automatically controls the operation and path of each vehicle to reach independently selected destinations.

2. Related Art

Problems of urban congestion, pollution, and traffic snarls are not new. As the world's population has increased, it has become more urbanized, which has only increased the severity of these problems. While the automobile has made man more mobile, it has also added to problems of congestion and pollution, and greatly increased man's consumption of certain natural resources. It has also greatly increased the likelihood of death or injury from transportation accidents. Moreover, the infrastructure required to support the vast number of trucks and cars consumes enormous amounts of public funds, building materials, and real estate. In the United States especially, the love affair with the automobile has spawned vast efforts in highway building to accommodate public demand. However, the rate of road building generally has not kept up with the rate of car driving and car buying. Consequently, congestion, pollution, and other related problems continue to increase. These issues all point out the need for better and more efficient mass transportation systems.

Transportation greatly affects the economy. One purpose of the Commerce Clause of the U.S. Constitution is to eliminate self-protective trade barriers between states. The familiar interstate freeway is one aspect of modern America that reflects this desire to reduce barriers, and is an important factor in this country's overall economic strength. Any driver can travel from state to state without stopping, buy and sell goods across state lines without paying tariffs, and without enduring border checkpoints and other inconveniences.

On the other hand, increased mobility presents security challenges for communities. Easy mobility contributes to greater anonymity and crime because, again, any driver can travel anywhere. Los Angeles, for example, has one of the finest freeway systems in the world. But when it came time to expand this grid by connecting I-210 to I-710, South Pasadena successfully fought the expansion for decades. They believed that the freeway would increase crime and erode the familiarity unique to their community. Similar opposition to freeway building has also been successful in other communities, such as Greenwich Village, N.Y. in the 1970's. Besides splitting neighborhoods, open freeways allow criminals to quickly and easily enter a community, commit a crime, and depart quickly.

While South Pasadena understood the hidden costs of a new freeway, the lack of connection between the 210 and 710 also hindered transit that would normally pass-by without stopping. By-passing transit encroaches on communities, but communities also encroach on bypassing transit. Growing communities tend to congest the transit systems, especially traditional high-speed ground transportation systems since they have dependencies or tiered collection systems. For example, local streets, collectors, and arterials collect traffic for freeways. Busses and planes do the same using hubs. These tiered collection systems represent an enormous supporting infrastructure.

To address these challenges, there have been many proposals for transit systems to help reduce the burden on (and need for) conventional surface roadways. Unfortunately, while mass transit systems have been built, expanded, and promoted, they can be very expensive to construct, they tend to be slow, and their scope remains relatively limited, particularly in areas of relatively low population density. Additionally, it has proven very difficult to wean Americans from their private automobiles when mass transit systems cannot offer the speed, independence, and flexibility that one enjoys with a private vehicle on open public roads.

SUMMARY OF THE INVENTION

It has been recognized that it would be advantageous to develop a high-speed transit system that provides independence and flexibility comparable to what drivers of private automobiles are accustomed to—allowing them to go where they want when they want.

It would also be advantageous to have a transit system that is compatible with private vehicles.

It would also be desirable to have a transit system that is enclosed and physically separated from other transit systems, vehicles, and pedestrians, so as to minimize safety and crime problems.

It would also be desirable to have an enclosed transit system that can be easily modified to allow ingress and egress at any additional desired point along its length.

It would also be desirable to have a transit system that can allow restricted ingress and egress at designated points.

It would also be desirable to have such a transit system that takes advantage of rapid computer-aided design and mass production techniques so that it is relatively inexpensive to build.

It would also be desirable to have a transit system that allows individual riders to board a vehicle already associated with the system, and have that vehicle take them directly to an independently selected destination.

The invention advantageously provides a point-to-point transit system for riders. The system includes an elongate guideway, a plurality of autonomous vehicles disposed in the guideway, a plurality of selectively actuable rider access portals in the side of the guideway, and a control system, configured to automatically guide the vehicles within the guideway. The rider access portals are configured to allow ingress and egress of riders to the autonomous vehicles in the guideway. The control system is configured to allow each vehicle to travel between origin and destination locations that are independently selected by a rider.

In accordance with a more detailed aspect of the present invention, the guideway includes a transit lane and a transition lane. The transition lane allows vehicles to decelerate to stop at a selected rider access portal, and to accelerate to a transit speed and merge into the adjacent transit lane. The control system allows the vehicles to combine into controllably linked "trains" in the transit lane. Upon approaching a selected destination, an individual vehicle returns to the transition lane to decelerate and stop.

In accordance with another more detailed aspect of the present invention, the autonomous vehicles can be relatively large, mass-transit type vehicles, or can be small private vehicles. The vehicles can be further configured to leave the guideway and be independently controlled by a driver outside the guideway.

Additional features and advantages of the invention will be apparent from the detailed description which follows, taken in conjunction with the accompanying drawings, which together illustrate, by way of example, features of the invention.

DETAILED DESCRIPTION

Figure 1:
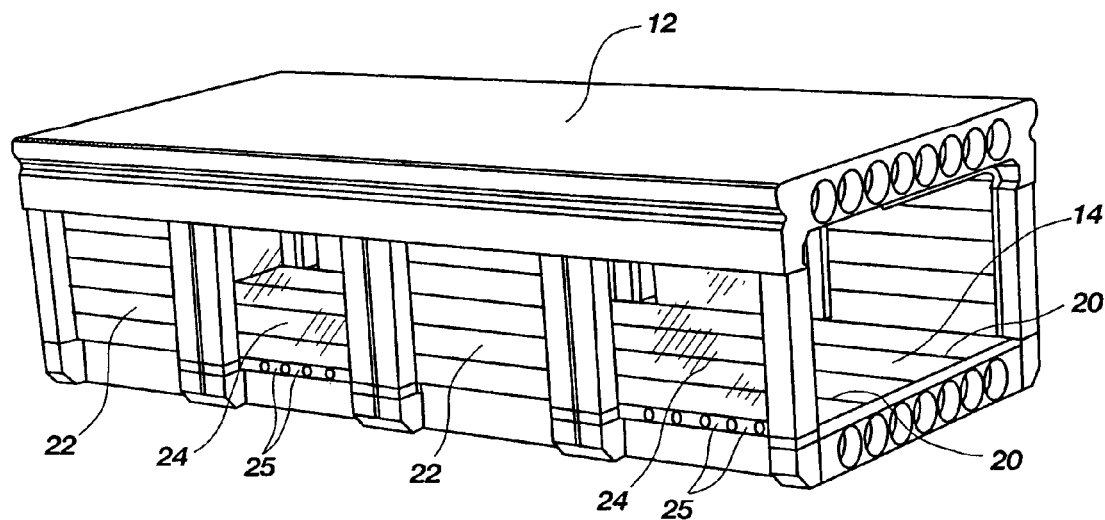
FIG. 1 is a perspective view of one embodiment of a single guideway segment for a transit system in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Creating high-speed multipoint-to-multipoint transit has always been a distant fantasy for wandering minds, exemplified by visions of magic carpet rides and science fiction transporters. The optimal process has remained elusive. However, the present invention makes high-speed multipoint-to-multipoint transit possible and economical without compromising accessibility or security in adjoining communities. The present System replaces traditional hubs and collectors with multipoint-to-multipoint transit. The invention is achieved by building a unique set of components: a multipurpose Transition Lane, non-stop Transit Lane and access Portals, which enable a repeatable, tube-like guideway segment. The Integrated Process of the System also decreases the area of land required for transit.

Traditionally, high-speed ground vehicles are monolithic, lumbering trains. They are not multipoint-to-multipoint vehicles; that is, they do not allow passengers to board or get off except at designated stops. The multipoint-to-multipoint system of the present invention allows users to board the system at any point along its line, and leave the system at any point along its line without inconveniencing other users.

Figure 2:
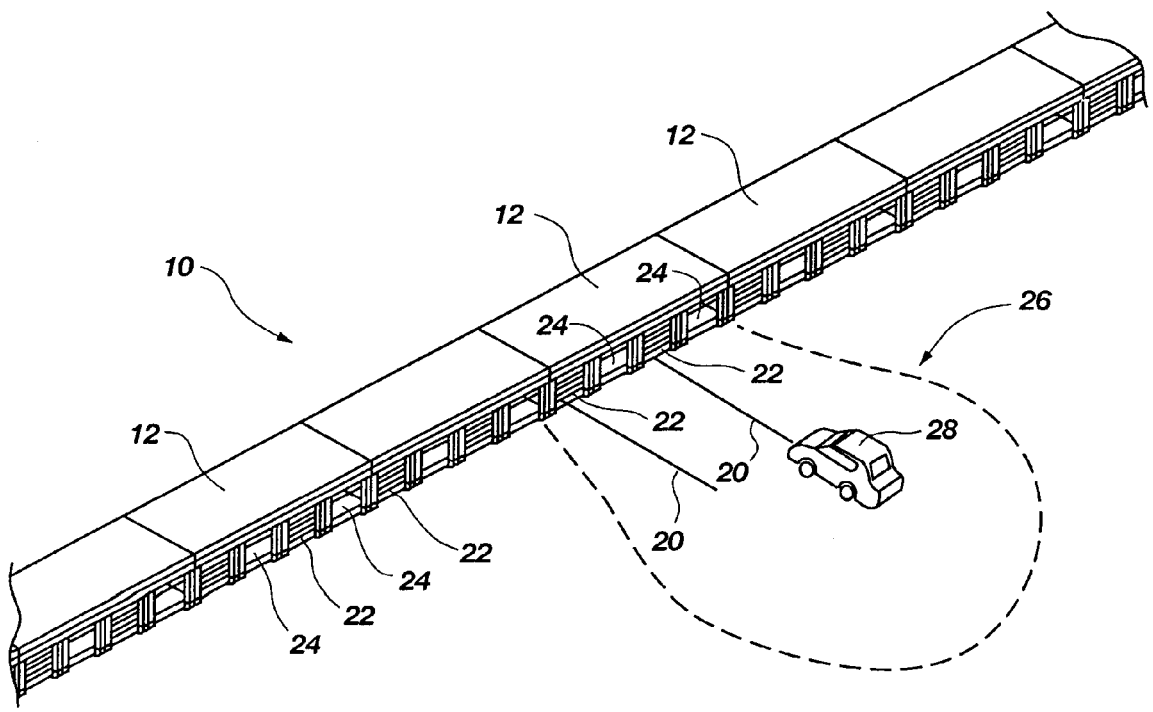
FIG. 2 is a perspective view of a port and an adjacent section of a complete guideway.

Referring to FIGS. 1 and 2, the invention includes a transit guideway 10 made up of a plurality of substantially enclosed guideway modules or segments 12, disposed end-to-end. Each module includes a riding surface 14 with a transit lane 16 and a transition lane 18, and a guide line 20 disposed in each lane. The guide line is configured for guiding vehicles 28 in the guideway, and may also be an electrical power supply line for providing electrical power to the vehicles.

As used herein, the term "vehicle" is intended to encompass any transportation vehicle having any type of propulsion system that may be compatible with the system, whether now known or later developed. For example, battery-powered electric vehicles, fuel cell-powered electric vehicles, electric vehicles that draw power from a shared power grid, and even vehicles with internal combustion engines could be used. It will be apparent that the substantially enclosed guideway 12 would tend to trap vehicle emissions, making gasoline and diesel-powered vehicles with conventional internal combustion engines poorly suited to the invention. However, some cleaner internal combustion engine vehicles—such as those that burn natural gas or pure hydrogen—could be suitable for this invention. However, electric vehicles are probably best suited to this invention. Moreover, for the sake of reliability, the vehicles may be configured to draw from redundant power sources. For example, an electric vehicle may have its own on-board electric power storage (e.g. batteries) or production (e.g. hydrogen fuel cells) capacity, along with a mechanism for drawing power from the guideway.

Figure 9:
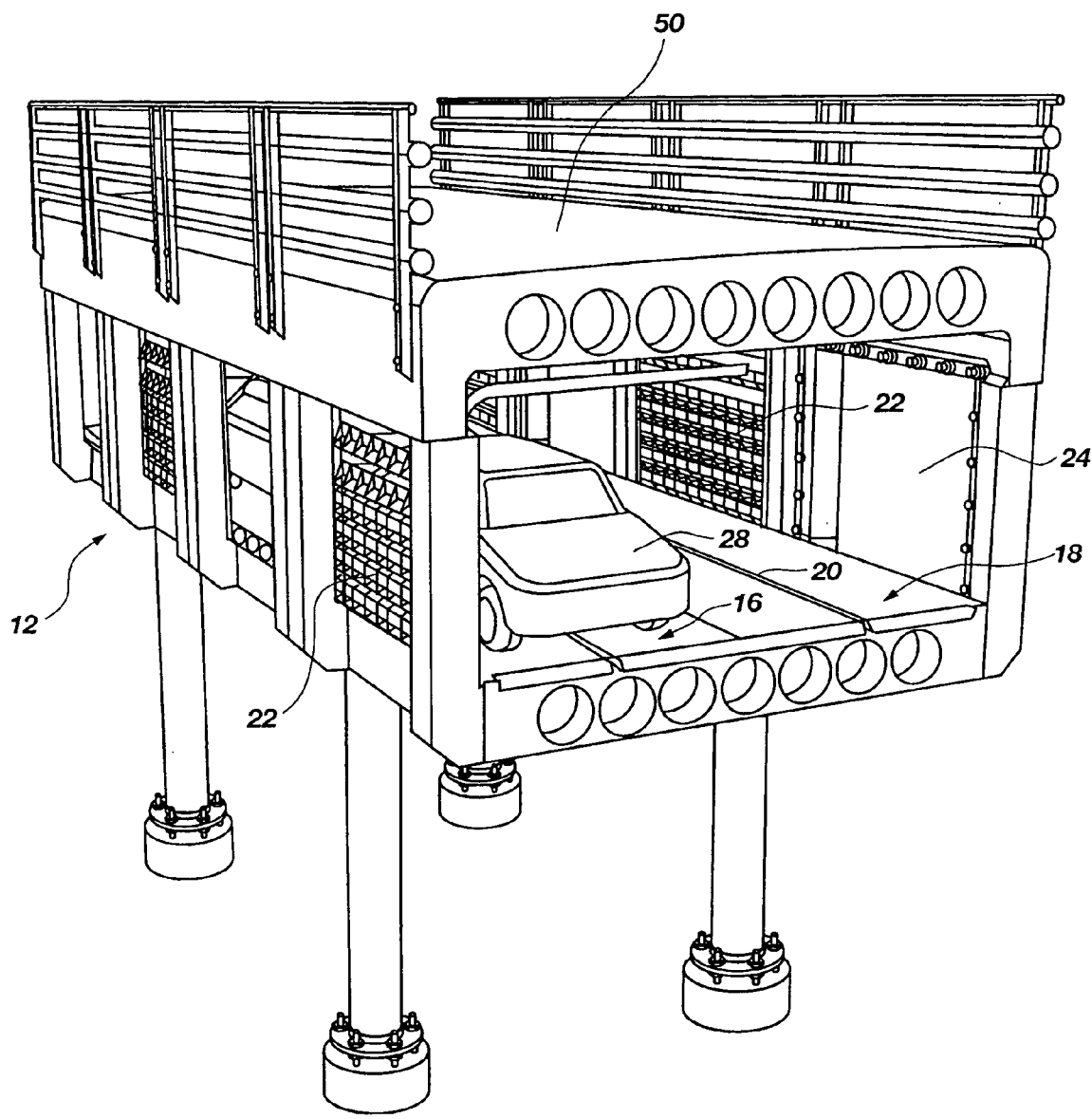
FIG. 9 is a perspective view of an elevated guideway segment with a pedestrian pathway thereatop.

Advantageously, the guideway modules 12 may be economically produced using assembly line techniques. The modules are very narrow, being just wide enough for the enclosed vehicles 28 in the lanes 16 and 18. The modules are preferably substantially enclosed, with portals 22 and windows 24 along each side. The portals comprise doors which, when activated, are openable to allow vehicles to enter or leave the guideway, but which generally remain closed for safety purposes. Indeed, the doors are only openable at activated portals, as described below. The windows 24 allow light to come in, and have drain openings 25 which allow air, some debris, and water to escape. The enclosed guideway configuration enhances safety, reduces noise to surrounding areas, and provides structural rigidity, allowing a standard module 12 to be used on-grade, or elevated as a bridge span, as depicted in FIG. 9. For elevated guideways, the support columns 60 may be provided with height adjusters, such as screws, bolts, etc., to allow very accurate alignment of adjacent guideway segments, and to allow periodic adjustment, such as to compensate for settlement of foundations, etc.

Figure 10:
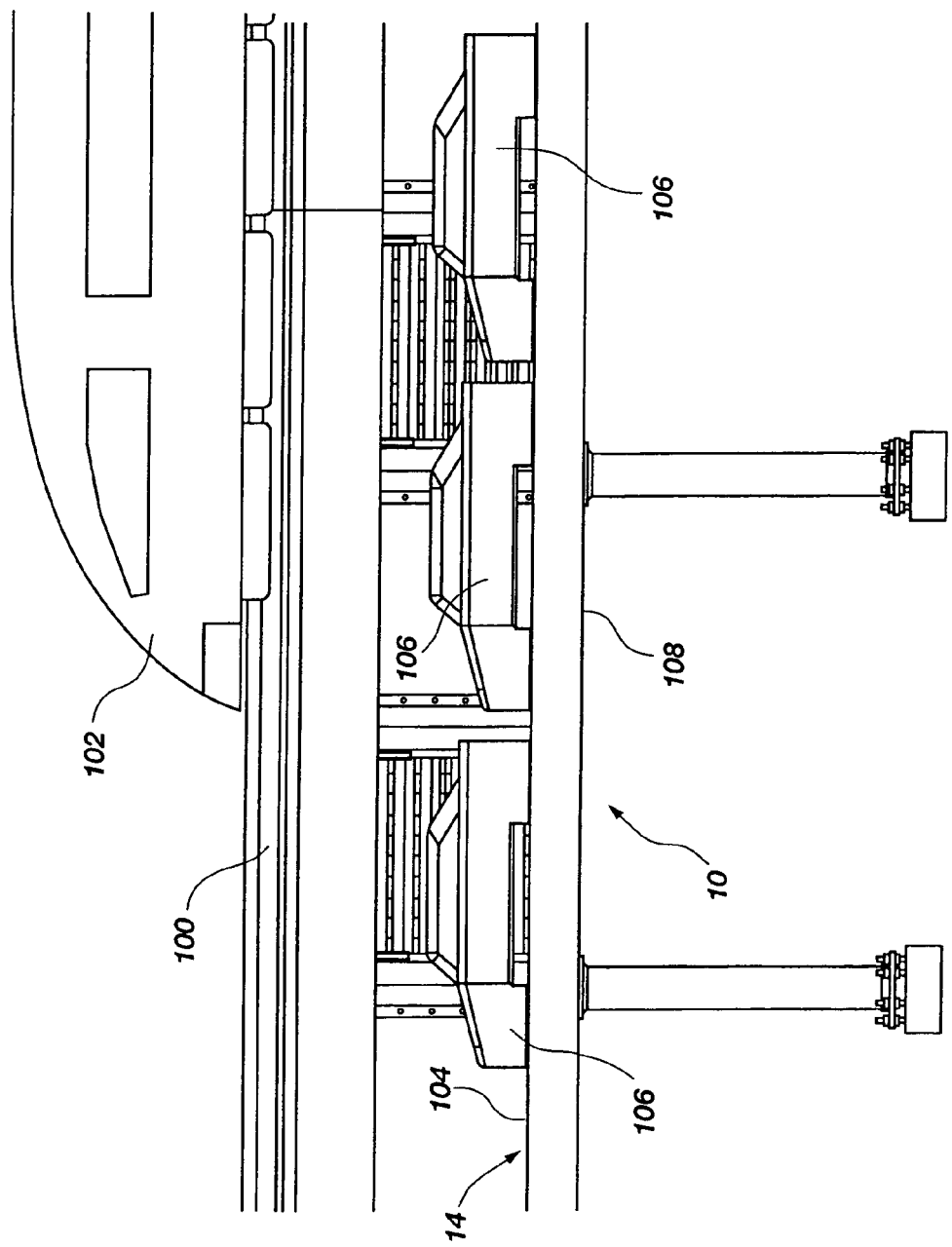
FIG. 10 is a side view of a guideway configured for accommodating magnetic levitation vehicles.

As shown in FIG. 9, the top of the guideway modules may be configured as a pedestrian pathway 50, which allows pedestrians, bicyclists, and even service vehicles and others to use the guideway structure. Alternatively, as shown in FIG. 10, the top of the guideway 10 could be configured to accommodate one or more tracks 100 for a mass-transit train 102. Such a train could, for example, be a magnetically levitated (maglev) train that does not ride on wheels, but "floats" just above the guideway in a magnetic field, thus having very low friction and requiring less energy for propulsion. Similarly, the riding surface 14 of the guideway could be configured as a maglev track 104, configured to accommodate individual specialized maglev vehicles 106. Additionally, a track (not shown) could be disposed on the underside 108 of the guideway to accommodate suspended vehicles, whether individual vehicles or a mass-transit train. Such a track for suspended vehicles could also employ magnetic levitation technology. These magnetic levitation tracks and associated vehicles could be configured for either high- or low-speed operation. The principles of magnetic levitation for transit vehicles are well known, and are under continued research and development and commercial implementation around the world in both high- and low-speed installations. See *Low Speed Maglev Technology Development Program, March* 2002 *Final Report* (U.S. Dept. of Transportation). Maglev vehicles are typically propelled by either a Linear Induction Motor (LIM) or a Linear Synchronous Motor (LSM) (referred to collectively herein as "linear motors"), wherein electric motor components (i.e. rotor and stator) are elongated into a linear configuration and are shared between the vehicle and the guideway (i.e, the vehicle includes the rotor components, and the guideway the stator, or vice versa). The motor components, whether in the vehicle or the guideway, are powered to produce an electromagnetic wave that directly pulls the vehicle along the guideway. Advantageously, in such propulsion systems the only moving part in the motor is the vehicle itself. Such propulsion systems can also be used with wheeled vehicles.

Referring back to FIG. 2, positioned at selected locations along the guideway 10 are ports 26, each disposed adjacent to one or more selected and activated portals 22. The ports are configured to allow vehicles 28 to enter or leave the guideway through the activated portals. The ports could take many forms, from large, publicly accessible transit plazas, to small private ports, even a single private garage. The system is designed to operate with autonomous vehicles. The vehicles each have typical motor vehicle controls which allow independent control of the vehicle by a driver on conventional roadways, but also include an automatic guidance system which allows (i) automatic guidance of the vehicle during ingress and egress through a portal, and (ii) interconnected control of the vehicle as part of a "train" 30 of similar vehicles within the guideway. A variety of computerized systems for providing such guidance have been developed, and are generally referred to as "Intelligent Vehicle Highway Systems" (IVHS). The vehicles may also be configured to draw electrical power from the guide line 20, as well as be guided by it.

In operation, a registered user first queries the computerized control system about available commutes between the departure Port and destination Port. Once the system secures all available commutes, the registered user can view and select available commutes. A vehicle can be summoned to a particular Port, or the user may query using a computer console (not shown) within the Vehicle. The System is designed to be communication-device independent and language independent. For safety, security and convenience, a simple phone call could remind the commuter that it is his or her turn to enter the respective Port, and a response on the user's phone could unlock the personal, commercial or public Vehicle.

Figure 7:
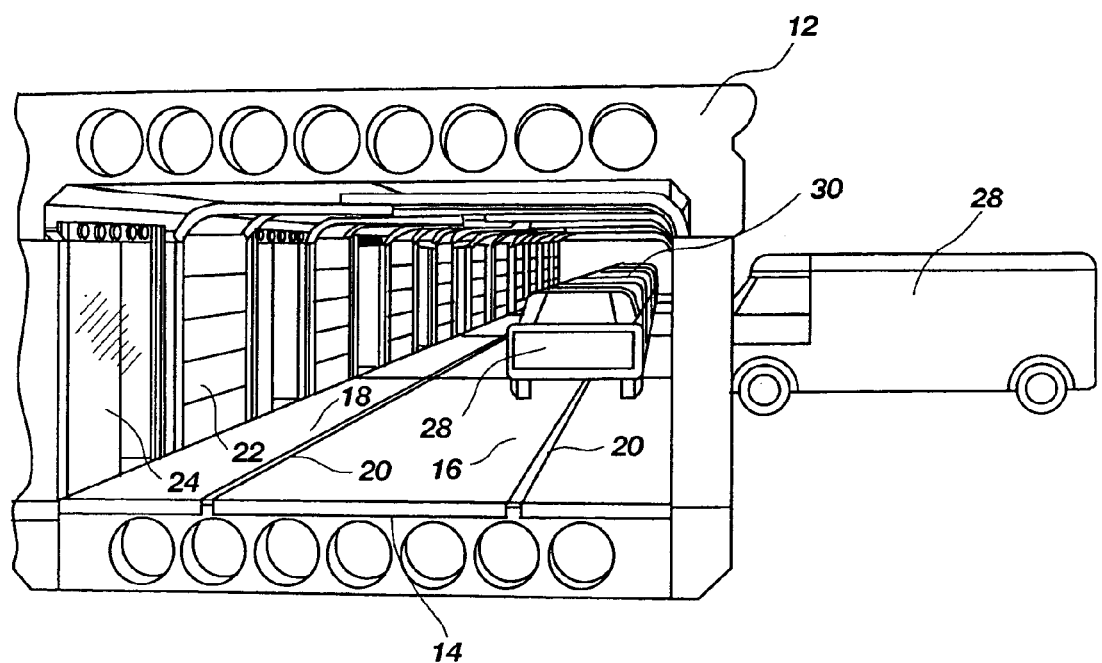
FIG. 7 is a perspective view looking down the guideway, showing a vehicle awaiting the passage of a train before it can enter a portal.

Referring to FIGS. 2 and 7, in operation, a vehicle 28 at a port 26 approaches an activated portal 22, whereupon control is taken over by the automatic guidance system. As a safeguard, before the Commute commences, the Vehicle(s) respective Portal remains closed and the Port is closed. Motion in the area is checked. If no motion is sensed, the area is clear and all sensors in the vehicle(s) are "go," the Portal door opens and opens a path from the port to the guideway segment. The portal door opens, and the guidance system guides the vehicle along a guide line 20 through the portal, and maneuvers it into the transition lane 18, facing in the transit direction 32.

Because of the small dimensions of the guideway 10, maneuvering into or out of the guideway will always require crossing the transit lane, and thus must be done within relief gaps 34 between vehicles or groups of vehicles (trains 30) already traveling in the transit lane 16. Depicted in FIGS. 3–6 are two methods of entering the guideway and two methods of exiting the guideway, depending upon the location (that is, the side of the guideway) of the transit lane 16 relative to the respective entry portal. These methods apply to any portal on the system, and make the portals dynamic in terms of ingress and egress, and allow each guideway to accommodate traffic in the reverse direction if required. The path for each vehicle is optimized relative to the standard paths distributed to each portal and provided by each port.

Figure 3:
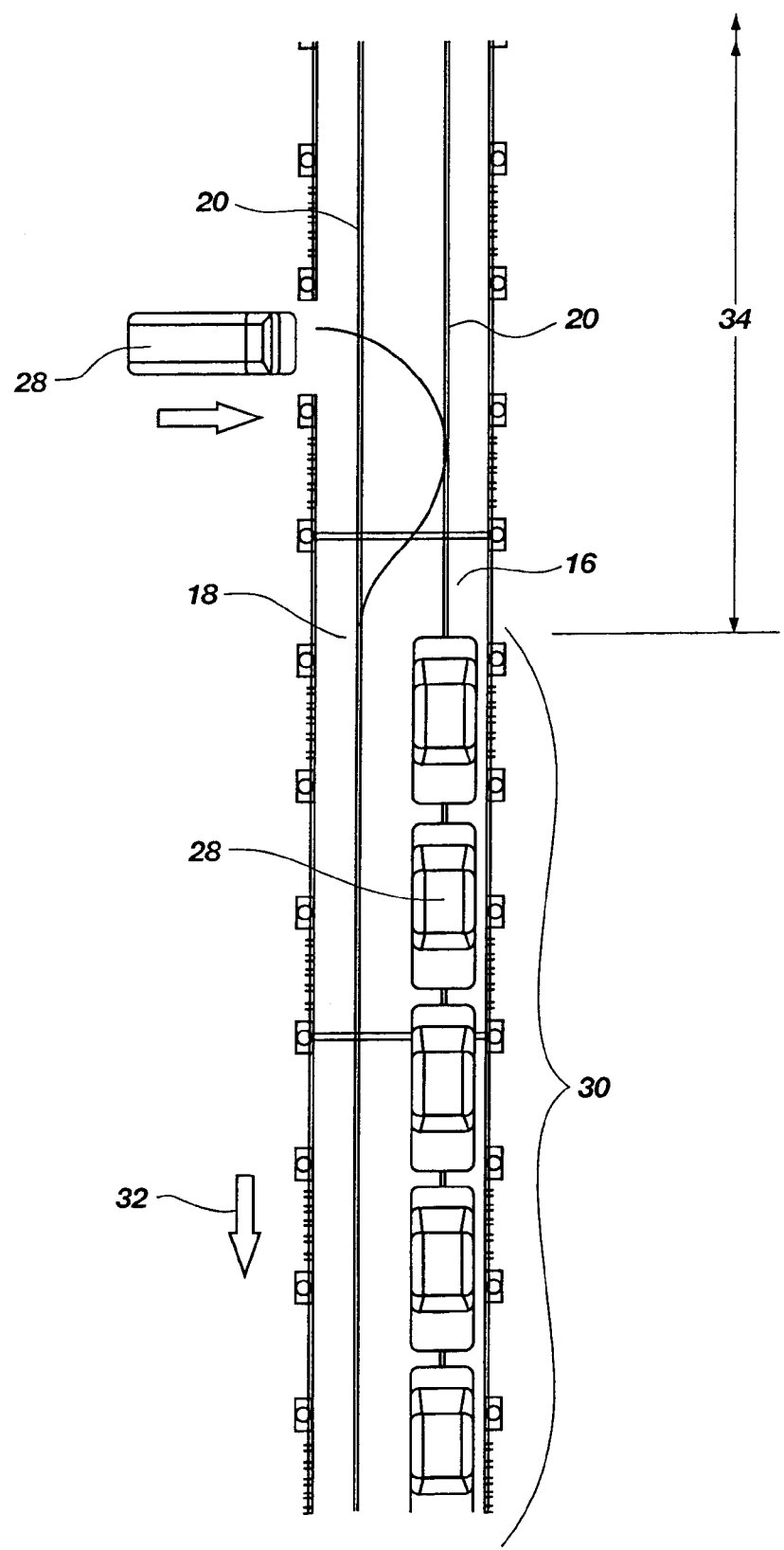
FIG. 3 depicts the method of ingress where the transit lane is on the opposite side of the guideway from the entrance portal.
Figure 4:
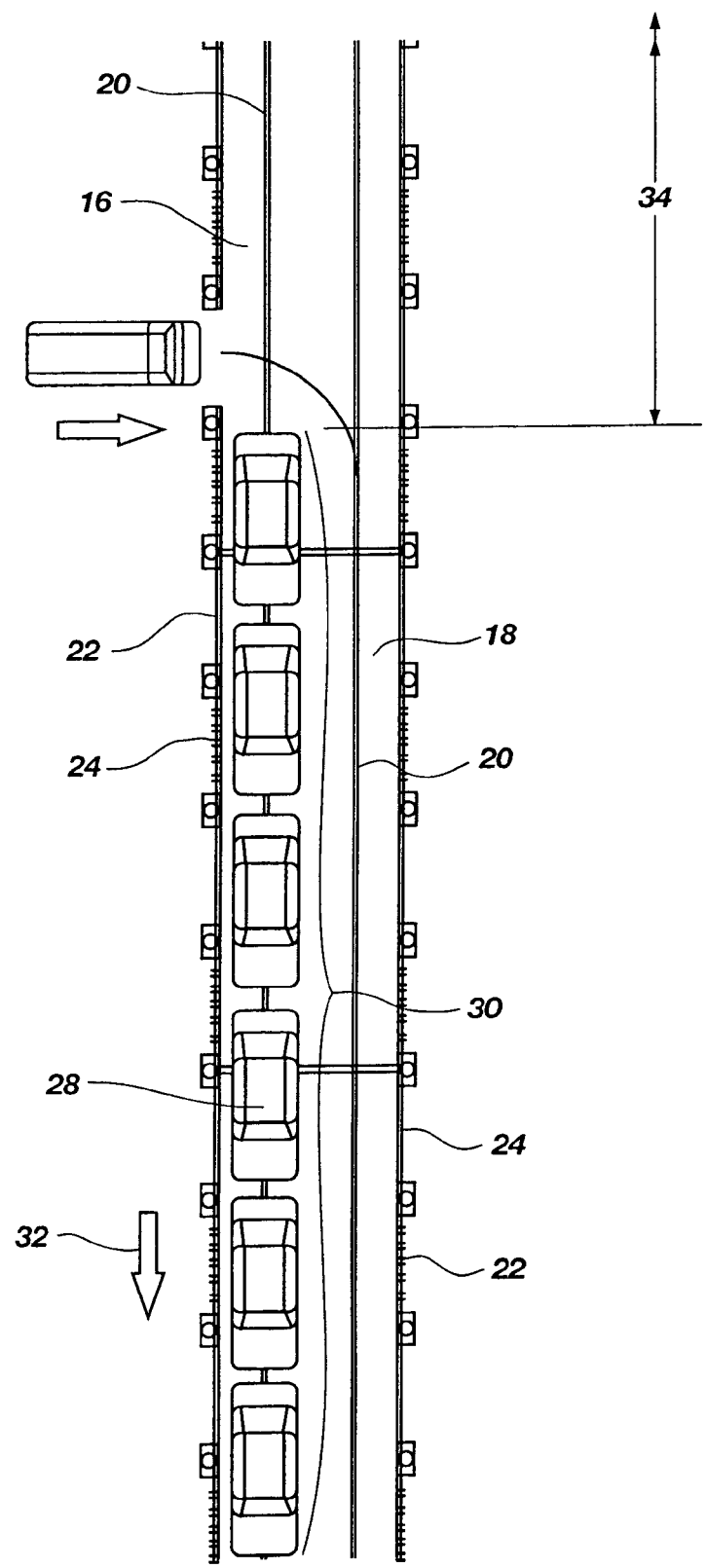
FIG. 4 depicts the method of ingress where the transit lane is on the same side of the guideway as the entrance portal.

Two different methods of entering the guideway and taking a position in the transition lane are shown in FIGS. 3 and 4. Viewing FIG. 3, where the transition lane is adjacent to the portal, the vehicle first crosses the transition lane, and while turning, passes into the transit lane within a relief gap 34 between trains, and immediately crosses back into the transition lane. Naturally, this will be a low speed maneuver (e.g. about 15 mph max). By using both the transit lane and transition lane to effect its entry into the guideway, a larger turning radius enables transverse entry, even entry from a substantially perpendicular position, and eliminates the need for dedicated ramps. Once in the transition lane and facing in the transit direction, the vehicle is prompted by the guidance and control system to accelerate under its own power to the transit speed and merge with a "train" 30 of similar vehicles traveling in the transit lane. It will be apparent that multiple vehicles could enter the guideway at the same time through the same relief gap. Indeed, vehicles having common destinations could be sorted and queued up at ports, then inserted into the system in groups.

It is preferred that the transit speed be a relatively high speed. For example, the system could be designed for speeds such as between 170 and 190 miles per hour. In one embodiment, the preferred speed is about 171 mph (275 kmh). However, other operating speeds may be used. For example, the system could be designed to operate at some desired maximum operating speed, but the actual operating speed could vary, globally or locally, depending on conditions such as congestion, time of day, the characteristics of the vehicles, etc. For example, the operating speed may be adjusted to increase the time characteristics of relief gaps for moving vehicles into and out of the system. If a large gap is needed, the speed of one or more adjacent trains could be temporarily adjusted so as to combine the trains, and thus combine their adjacent relief gaps.

Alternatively, an entire system could be designed for a relatively low speed, such as in a congested urban area. Additionally, a low speed system could be connected to a high speed system through one or more portals, or through specialized ramps. For example, the parking garage of a large office building may include a low-speed guided transit system as described herein, which is connected to an adjacent high-speed guideway. When vehicles exit the high-speed guideway and enter the low-speed garage system, they can be automatically guided to specific areas of the garage, to assigned parking spaces, or to the closest available parking space, such as through a branching system.

Viewing FIG. 4, a similar ingress method is used where the transit lane is adjacent to the portal. In this situation, the vehicle crosses the transit lane within a relief gap, and turns directly into the transition lane in the transit direction. Once the vehicle is centered in the transition lane, it accelerates to the transit speed, and merges with a train in the transit lane as described above. Because the entire system is computer controlled, timing can be very accurate and still avoid collisions of any kind.

While the transit system is shown having transit and transition lanes for use in the same direction, the system could alternatively be configured for bi-directional traffic within the two lane guideway. Such a system may be best suited to low speed and low capacity applications. It will be apparent that in such a system, each direction of traffic could use the opposing lane as its transition lane, and that relief gaps in both directions would have to be properly coordinated to allow such use.

The "trains" 30 comprise multiple vehicles 28 which are very close together and traveling as a unit, though they are not physically connected. However, they are controllably linked (using e.g. a control system comparable to known intelligent vehicle highway systems), such that the driver in each vehicle does not control the movement of his own vehicle once it enters the guideway, and his attention is not required.

One advantageous aspect of this system is flexible multipoint-to-multipoint travel logic. Portals 22 exist on both sides of every module 12, but can only be activated (i.e. opened) at established ports 26. However, new ports can be established at any desired location because all guideway segments include portals on both sides. Portals and/or ports can also have restricted access, thus allowing businesses, governmental facilities, communities, and other locations to control who enters their ports and when. For example, the computer control system may be configured to prevent unauthorized vehicles from selecting a particular destination (portal address) before their commute commences. Once a destination is selected, the computer system determines the optimal route for the vehicle to take to reach the destination, and determines the proper timing to open the portal and guide the vehicle into the guideway to accelerate and unite with a passing "train" of vehicles.

When an individual vehicle 28 approaches its programmed destination portal 22, it automatically separates from the train 30 and crosses into the transition lane 18, where it slows down. Because the vehicles in a train are not physically connected, the departing vehicle does not impede the progress of the train as a whole. Instead, the control system simply causes the remaining vehicles in the train to simply close any gaps in order to maintain the aerodynamic efficiency of the "train," and to thereby add to the size of the relief gaps 34 before or behind the train. Once the exiting vehicle slows to an appropriate exit speed, and is aligned with a relief gap between trains, the vehicle automatically turns and maneuvers itself out of the guideway through the selected portal.

Figure 5:
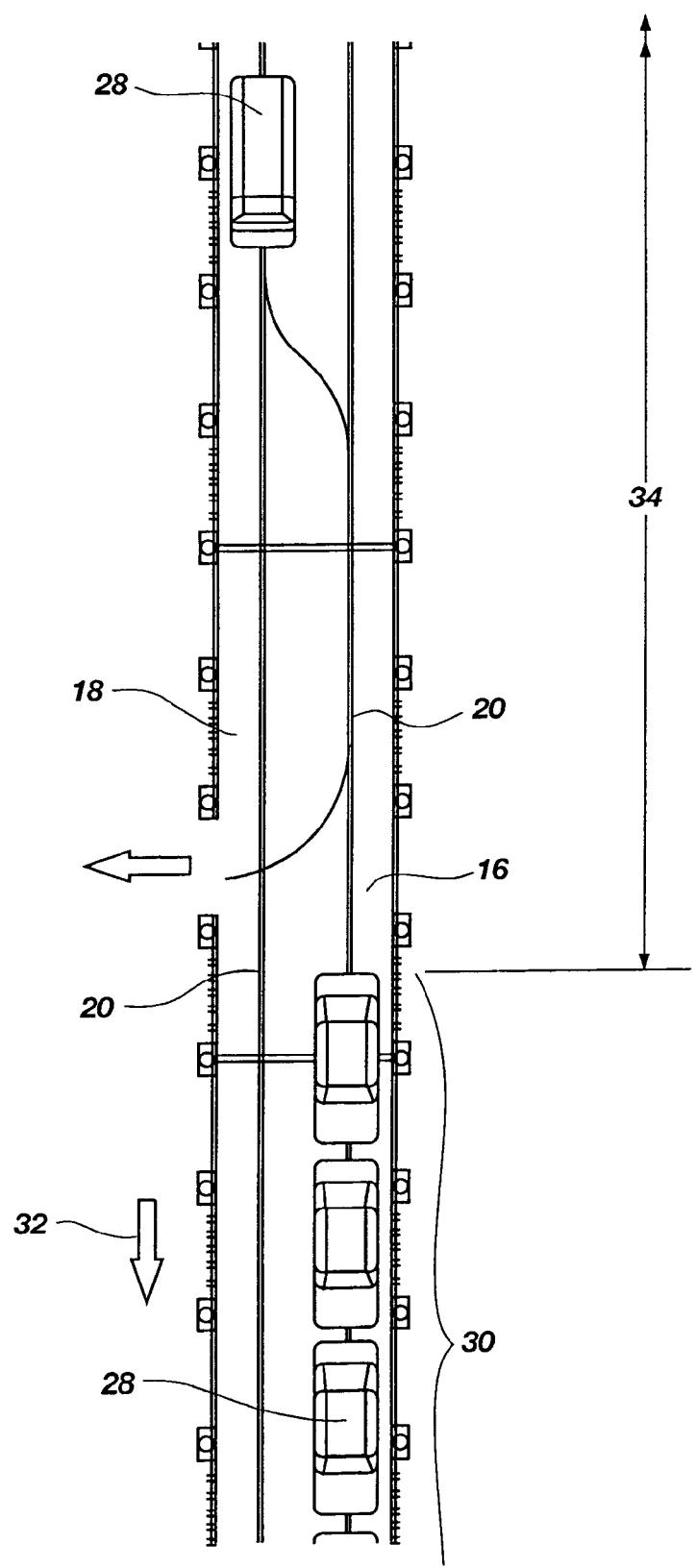
FIG. 5 depicts the method of egress where the transit lane is on the opposite side of the guideway from the exit portal.
Figure 6:
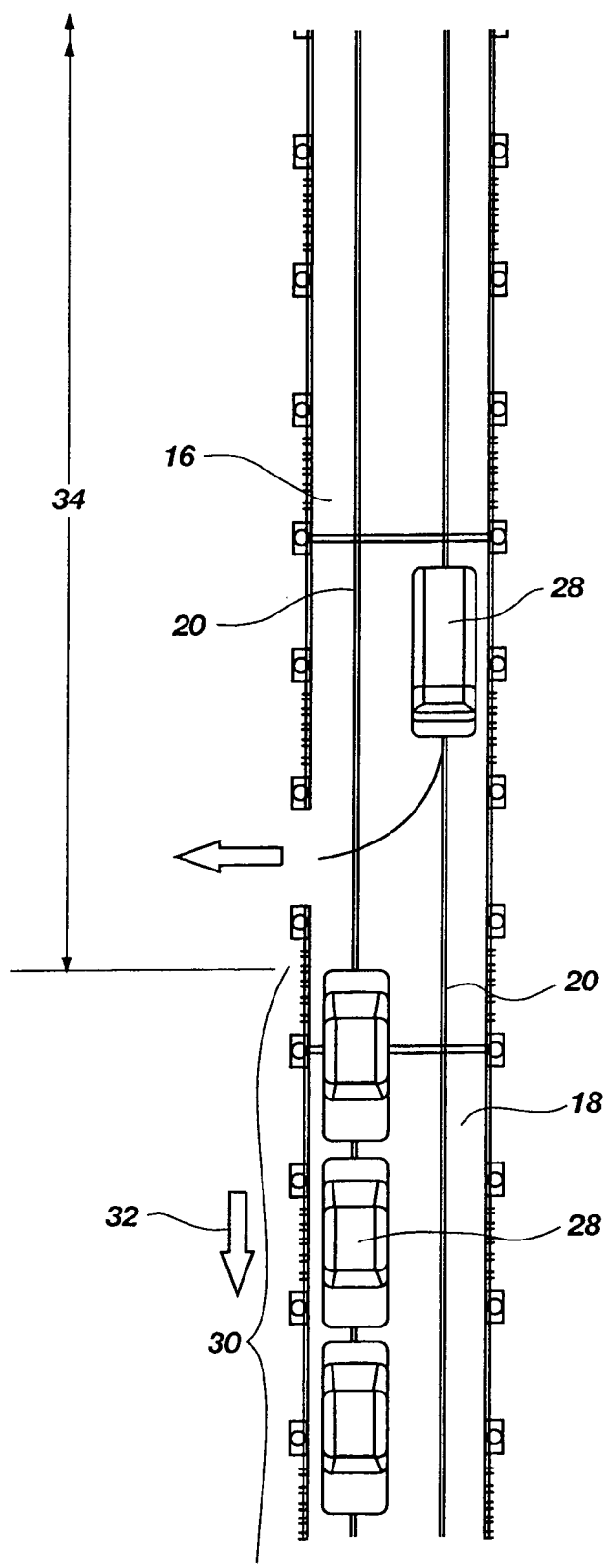
FIG. 6 depicts the method of egress where the transit lane is on the same side of the guideway as the exit portal.

Two different methods of slowing down and leaving the guideway 12 from the transition lane 18 are shown in FIGS. 5 and 6. Viewing FIG. 5, when the intended portal 22 is adjacent to the transition lane, the vehicle 28 will diverge from the train 30 into the transition lane, and slow down so as to align with a relief gap 34. The vehicle then moves back into the transit lane and turns across the transition lane to exit through the destination portal. When the intended portal is adjacent to the transit lane, as depicted in FIG. 6, the vehicle simply diverges from the train and merges into the transition lane, where it slows to its exit speed. When aligned with a relief gap, the vehicle turns and crosses directly over the transit lane and through the exit portal.

As with entering the guideway, it will be apparent that multiple vehicles could exit the guideway in a group. Additionally, for some applications, the guidance system could be configured to allow vehicles to exit the system in reverse. For example, as mentioned above, a port could take the form of a private garage. In such a case, when the vehicle assigned to that port approaches, it enters the transition lane, and may slow to a stop just beyond the portal. When aligned with the appropriate relief gap, the vehicle moves in reverse and exits the guideway directly into the private garage directly behind the portal door. Then, when the driver again intends to use the vehicle, it is exactly positioned to reenter the guideway through the portal.

After leaving the guideway 12 and entering a port 26, control of the vehicle 28 may be returned to the driver for operation in the manner of a conventional motor vehicle. Alternatively, the vehicle may not be a personal vehicle, and may stay at the port, the user(s) simply paying for its use on one or more trips, and disembarking at the final destination port. This sort of use is the presumed mode for individual maglev vehicles (106 in FIG. 10) because the specialized vehicles can only operate on the guideway, and are not configured for driving on conventional roadways. With common-use vehicles, a commuter traveling to a particular office each day may live close to the guideway at some location and walk to a port, or take a bus or other transit system to the port. There the driver boards one of many temporary use or rental vehicles waiting at ports for just this purpose, and travels to a destination port located at his office building or nearby. The user may pay to have a private vehicle, or (for perhaps a lower price) may board a vehicle with other system users headed to the same destination. The rental vehicle can then wait at the destination port for future users, or, because drivers are not required on the guideway system, the vehicle may be automatically sent to another port where demand for its use exists. At the end of the day, the worker simply repeats the process in reverse.

The transit system of the present invention is very economically dynamic, and allows costs to be allocated directly with supply and demand. The system is intended to be mechanically analogous to the Internet, where a set of data is divided and packaged into discrete bundles, and each bundle is sent via the most efficient available route to its destination, where the various bundles are then reassembled into the whole data set. Similarly, the present system assigns the space within the guideway into virtual "packets." Travel on the guideway requires the user to purchase sufficient packets to accommodate the physical size of their vehicle. The cost of the travel is individually apportioned to each vehicle depending upon various economic factors, such as the distance traveled, the location of the origin portal, the location of the destination portal, the time of day, the degree of actual congestion within the guideway at the time, the physical size of the vehicle, the priority of the vehicle, content of the vehicle, grid power used, port entry charges, etc. Other factors may also come into play.

The system can also dynamically adjust to supply and demand in many ways. When congested, it can provide priority access to users willing to pay a higher price. It can allow a user to set (i.e. input into the computer system) a maximum price he/she will pay to obtain a public use vehicle within a certain time frame, such that the highest bidder can always obtain immediate service. During busy times, the price will automatically go up because demand is higher. During slow times, the price will go down because demand is lower. And, because the vehicles can travel autonomously to any port, the supply of public use vehicles can always be directed to the locations where the demand exists. Additionally, if a private vehicle stalls or in some other way causes delay or congestion to other users, the party paying for the trip may be charged (in whole or in part) for the extra delay or other expense created by the breakdown. Thus, ordinary forces of market economics can be harnessed to help ensure an efficient and safe system.

Depending on the commute to the destination portal and the independent destinations of other nearby vehicles, the vehicle may transition to other trains along the way. For additional transition time, a commute may utilize a port as a temporary stop. As an example, at a transit speed of 171 mph, a vehicle may commute from Los Angeles to Dallas (1,430 miles) in about 8.4 hours. The "driver" may recline into a personal bed and awake upon arrival, for the beginning of a business day. The "driver" may also choose to perform additional work during the commute since driving is unnecessary.

The use of repeatable guideway segments facilitates assembly line manufacturing that will bring costs down when compared to traditional highway construction methods. A spline defines the central axis of each guideway segment. Computer Aided Design methods auto-align and "mold" the repeating guideway segments onto each spline. This method creates new guideway segment models with proper curve and slope for each turn. This allows most design optimization, manufacturing, and assembly to be performed automatically. Likewise, it also permits reusing the same part in multiple locations and standardizing curves to maximize commonality and interchangeability. This automated engineering practice reduces engineering design to insignificant proportions, and also reduces manufacturing and assembly costs.

Figure 8:
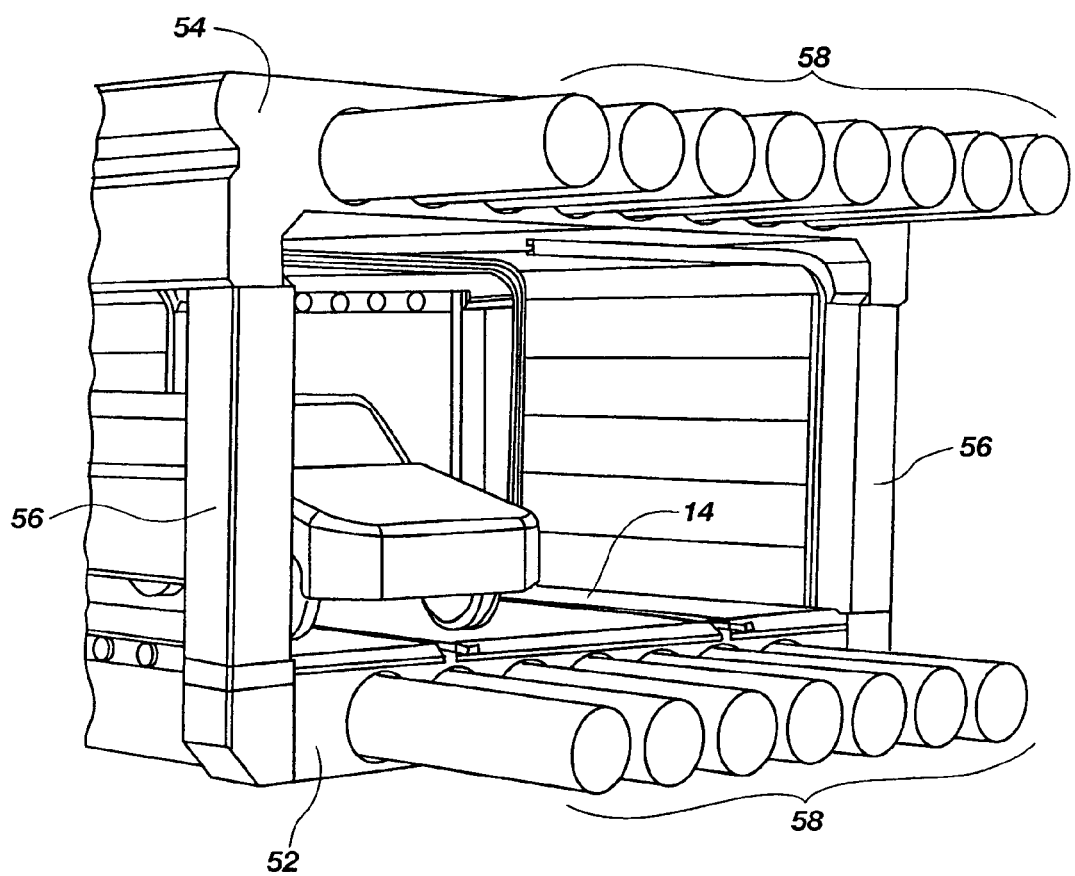
FIG. 8 is a cross-sectional perspective view of a single guideway segment.

The structural design of the guideway segments may take a variety of forms. Referring to FIG. 8, in the configuration shown and described herein, the riding surface 14 comprises a bottom slab 52, and the roof of the guideway is a top slab 54, supported on a plurality of columns 56. As shown, the top and bottom slabs are precast (probably prestressed) concrete slabs (e.g. "voided slabs" as are widely used in small span bridge building). The voids in the slabs, usually in the form of embedded conduits 58, reduce the weight of the respective slab, and also provide a convenient passageway for extending communication lines, power lines, etc. through the length of the guideway. The slabs may also be made using lightweight concrete to further reduce weight.

It will be apparent that the guideway segments can be made of materials other than concrete, and a variety of materials and configurations may be contrived to construct the individual guideway segments in accordance with the present invention. For example, guideway segments having more than two lanes (a transit lane and a transition lane) may be created. Guideway segments with three lanes can allow converging and diverging for providing continuous-flow ramps for non-stop transition from one guideway to another. "Double-decker" guideway segments could be produced. Portal doors that move downward to open (rather than upward) could be used. These are just a few of many possible variations.

For assembly, individual guideway segments 12 may be transported along the top of the previously installed guideway segments from the manufacturing location to the growing guideway. There the new segments may be lowered into place using a traveling gantry crane. Naturally, this will require that the guideway segments be structurally designed to support such traveling loads during construction. Other assembly methods may also be conceived for facilitating rapid construction while reducing costs.

Because portals can only open if they are activated, and can be restricted access, the system provides a dynamic security boundary between departures and destinations. This resolves the inherent conflict between transit systems and communities by allowing transit to pass-by without actually passing through the community. The boundary can be uniquely dynamic, i.e. according to time of day, day of week and by each person's, or cargo's, identity. This system advantageously builds a more dynamic boundary between communities and transit.

Following are several examples of scenarios showing the advantages of this system.

EXAMPLE 1

A manager asks a subordinate to come to California as soon as possible. There is no need to go to a hub like an airport. The subordinate simply summons a rental vehicle and goes directly to the manager's site in about 2 hours. There is no need to deal with freeway or airport hassles. The subordinate could literally take care of business and return back home in time for dinner.

EXAMPLE 2

Since the vehicle is autonomous, one family could use a single vehicle for all commutes. The vehicle could return to pick up family members at home, or at other destinations. The vehicle could even provide commutes for the canine companion. Dogs could utilize this system, in their own autonomous way. The family could also drive the vehicle on traditional infrastructure (i.e. between their home and a public port). In addition, the system would be useful to the blind, elderly, under-aged drivers and those who have lost their drivers license due to driving under the influence.

EXAMPLE 3

Freight vehicles may transport palates of product rather than a truckload Freight could be shipped more often, with less latency, and be more able to ship around-the-clock, which greatly reduces the need for large hubs and storage. Since the vehicles are autonomous, freight could be shipped during off-peak hours, thus saving costs and optimizing use.

EXAMPLE 4

A department of transportation may choose to install a system in accordance with this invention instead of having a multi-lane freeway. One transit lane of this system can have more capacity than a four or five lane freeway. In addition, the system minimizes noise pollution, most of the air pollution, require less land, requires less energy, requires less supporting infrastructure, and adds greater value to the surrounding land than a traditional transit system.

EXAMPLE 5

A community may grant public access to their Ports during the daytime, but close access at night.

The invention thus provides a transit guideway configured to receive multiple independent vehicles and combine them into controllably linked "trains" on a common guideway, the vehicles entering and leaving the guideway in a direction transverse, even substantially perpendicular, to the direction of travel therein. The guideway is preferably comprised of prefabricated enclosed modules, and the transit system follows point-to-point travel logic, which controls the path of each individual vehicle to reach independently selected destinations.

With this system, access is maximized, and the need for expensive and massive supporting infrastructure is minimized. At the same time, existing investment is leveraged by using a common vehicle. In addition, the configuration of the portals permits an economical enclosure. High speed will be more reliable, because weather will no longer be a factor, except in extreme conditions. Large supporting infrastructure often creates bottlenecks. When capacity fills with congestion, the system is affected as a whole. The multipoint-to-multipoint commuting, unlike hub commuting, has a greater ability to reroute, limit and optimize traffic on more parts of the system. Bottlenecks are therefore minimized, because dependencies are reduced.

The system of this invention will have a positive effect on fuel economy, produce a smaller environmental footprint on land, reduce noise and air pollution, and insulate traffic from communities, children, and animals. It provides fully automated transit that is personal, non-stop, high-speed, and replaces traditional hub systems with true multipoint-to-multipoint mass transit. It provides a mechanism for rapid deployment and response of security, military personal, logistical support and emergency vehicles when needed, even to the exclusion of other vehicles, and may even provide some added protection from airborne diseases (naturally occurring diseases and bio-terroristic diseases) because the guideway is enclosed and passengers remain in individual vehicles. As mentioned above, the system provides improved community security and privatization of communities, vehicles and roads, and provides improved mobility for the elderly, handicapped, and other persons not able to hold a drivers license.

Figure 11:
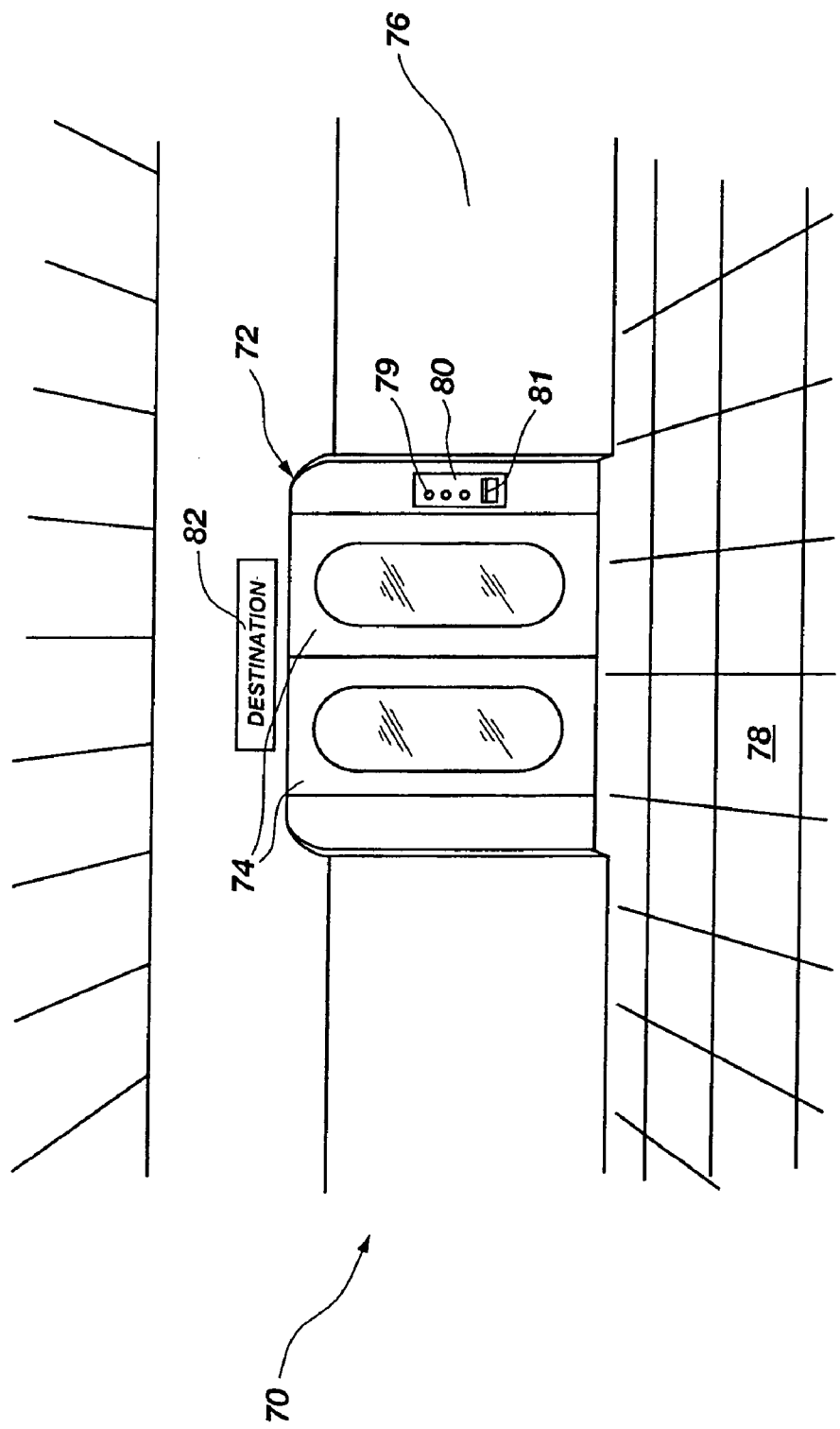
FIG. 11 is a perspective view of a rider access station and a rider access portal configured to allow individual riders to board a vehicle within a guideway.

The above-described transit system is configured for use by specialized vehicles that enter and exit the guideway through vehicle portals. Depicted in FIGS. 11-13 are other embodiments of the invention, wherein individual riders can enter and leave the system through special rider access portals that allow access to vehicles already in the guideway. Viewing FIG. 11, a rider access station 70 includes one or more rider access portals 72, having doors 74, such as sliding doors, disposed in the side of the guideway 76, adjacent to a waiting platform 78. Controls, such as call buttons 79, etc. can be located on a control panel 80 adjacent to the portal to allow individual riders to call a vehicle, input a destination, etc. A digital message board 82 can be disposed above the rider access portal to inform waiting riders of relevant information, such as the destination and estimated time of arrival of the next vehicle scheduled to arrive adjacent to that particular portal. Thus, as shown in FIG. 13, a rider station 70 can include a series of rider portals 72, each designated for a different noted destination. Passengers simply line up near the portal displaying the desired destination, and await the next vehicle to stop at that portal.

Figure 12A:
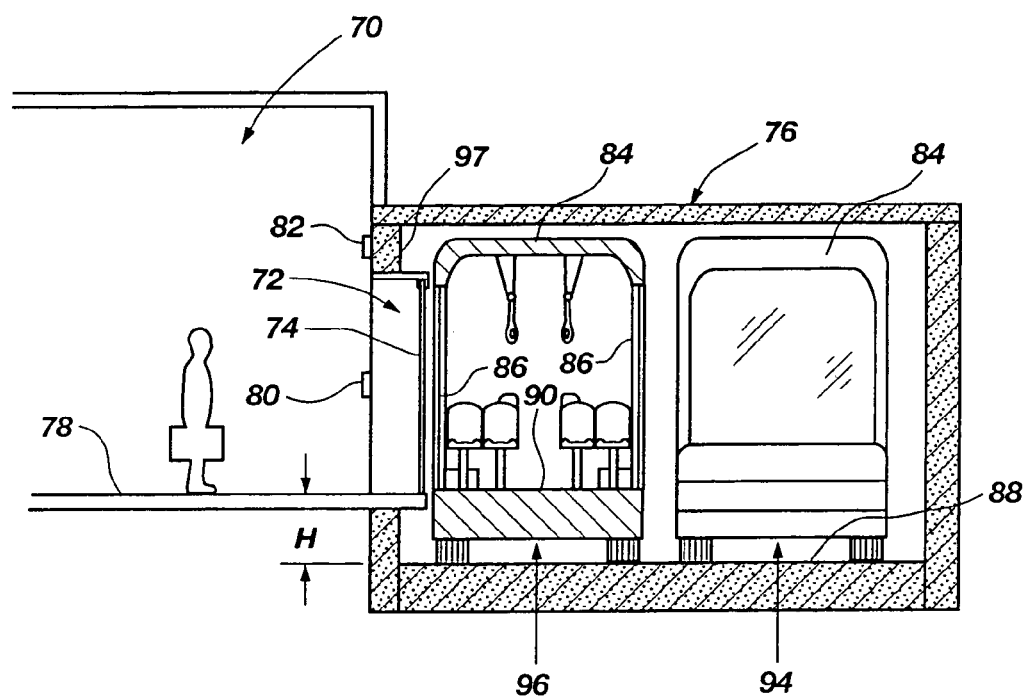
FIG. 12A is a cross-sectional view of a guideway segment and a rider access station with an elevated platform, showing a vehicle in the guideway, aligned with the platform and a rider access portal.
Figure 12B:
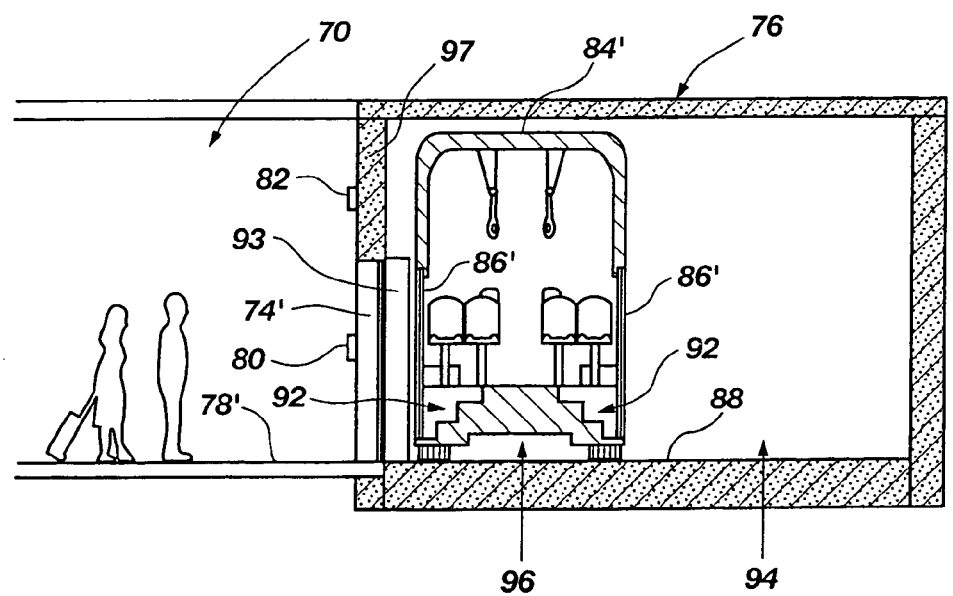
FIG. 12B is a cross-sectional view of a guideway segment and a rider access station having a platform that is at the elevation of the guideway riding surface, showing a vehicle in the guideway aligned with the rider access portal.
Figure 12C:
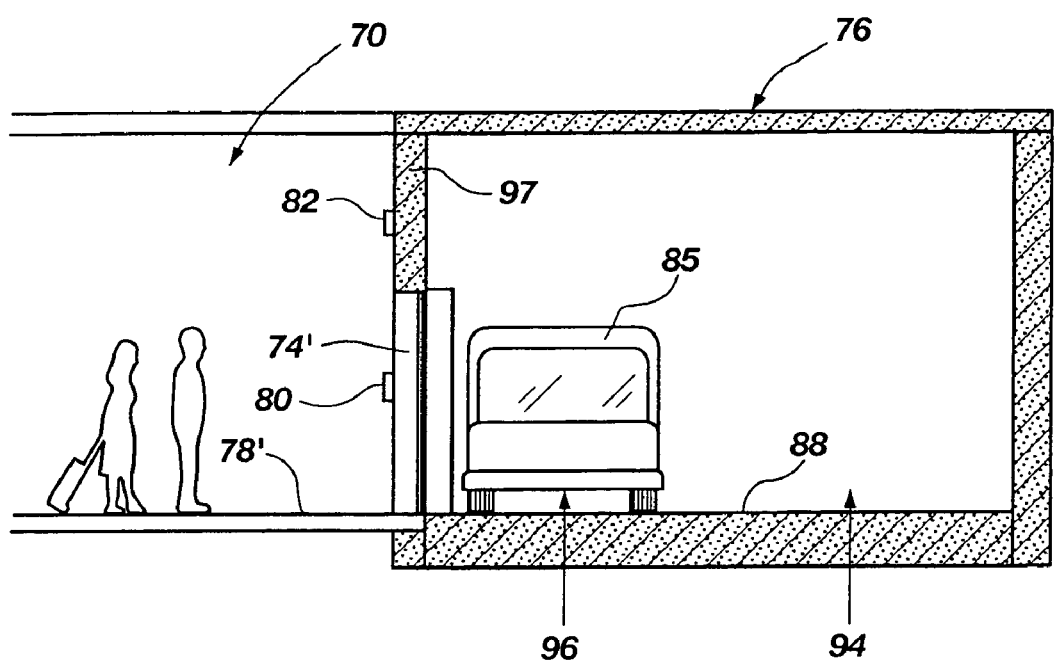
FIG. 12C is a cross-sectional view of a guideway segment and rider access station like that of FIG. 12B, having a smaller sedan-type vehicle stopped at the rider access portal.
Figure 13:
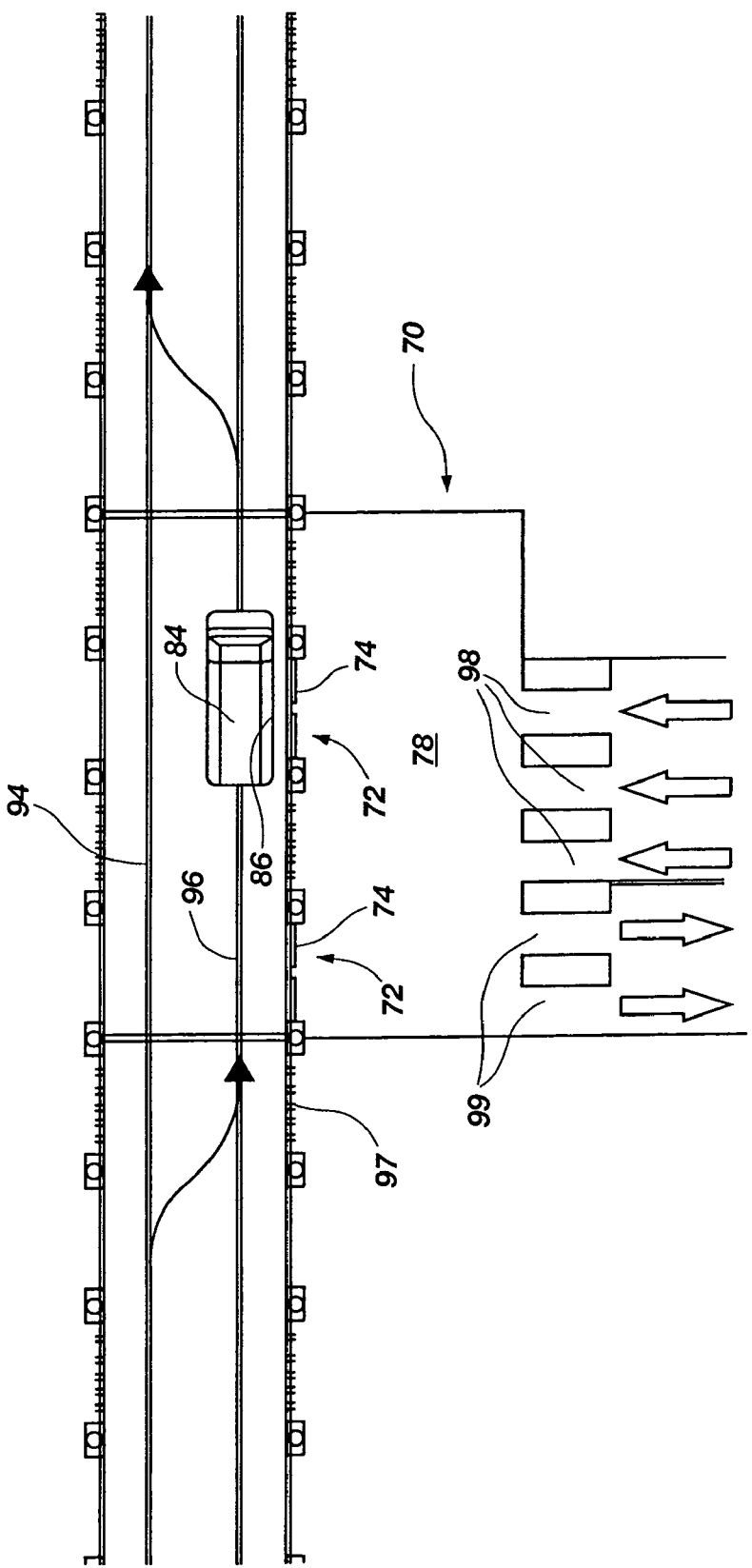
FIG. 13 is a plan view of a rider access station and a portion of a guideway with a vehicle aligned with a rider access portal.

Viewing FIGS. 12A–12C, the vehicles 84 for the rider access system have doors 86 corresponding in size, shape, and/or location to the rider access portal doors 74. In one embodiment, shown in FIG. 12A, the waiting platform 78 and rider access portal doors are placed at an elevation that is a distance H above the riding surface 88 of the guideway 76. The height H may be chosen so that the platform elevation corresponds to the elevation of the floor 90 of the vehicles that will stop at the rider access portal 72. Alternatively, the height of the platform above the riding surface of the guideway could be comparable to the height of a standard sidewalk curb, or some other height. As shown, the portal may also jut slightly into the interior of the guideway, so as to facilitate alignment with the vehicle, and to reduce the size of the gap between the vehicle and the portal doorway. This can help eliminate trip points and possible hazards associated with ingress to and egress from the vehicles. This configuration makes the system easy to use for handicapped persons and riders with large or rolling items, such as luggage. Riders simply walk or roll onto the vehicle from the platform. It can also enhance safety and security by preventing a rider or other unauthorized person from entering the guideway.

Alternatively, the waiting platform 78' and rider access portal doors 74' can be aligned with the level of the riding surface 88 of the guideway 76, as shown in FIG. 12B. In such a configuration, the vehicles 84' can include stairs 92 that allow riders to climb up into the vehicle when the doors open, similar to the manner of boarding a typical city bus. For added safety and security, small partitions 93 can be provided adjacent to the portal 72' inside the guideway to reduce the size of the gap between the vehicle and the portal doorway so as to prevent a rider or other unauthorized person from entering the guideway. These partitions can be retractable, so as not to extend into the interior of the guideway when the respective rider access portal is not in use.

Shown in FIG. 13 is a plan view of a rider station 70 and a portion of a guideway 76 with a rider access vehicle 84 aligned with a rider access portal 72. When the vehicle approaches the rider access portal, it diverges from the transit lane 94 into the transition lane 96. As the vehicle approaches the rider access portal door and prepares to stop, an automatic guidance and control system guides the vehicle to a position such that it is very close to the side wall 97 of the guideway, and so that the vehicle doors 86 are aligned with the rider access portal doors 74. When the vehicle is properly aligned and at a complete stop, both sets of doors (the portal doors and vehicle doors) open substantially simultaneously, allowing riders to move directly from the platform 78 into the rider vehicle, and vice versa. The rider access vehicles 84 shown in FIGS. 12A and 12B have doors 86 on both sides. This configuration provides flexibility for the system by allowing rider stations 70 to be located on either side of the guideway, as circumstances require. Advantageously, the flexible computerized control system allows the transit and transition lanes to be interchanged when needed. Thus, moving vehicles can move from one side of the guideway to the other to accommodate rider access portals on either side.

The transition lane is always the lane adjacent to the rider access portals. If it is desired to have rider access portals on both sides of the guideway at a particular location, several alternate configurations are possible. As one alternative, guideway segments having more than two lanes could be provided to allow transition lanes and rider access portals on both sides of the guideway at a particular location.

Alternatively, to allow rider access on both sides of a guideway, the computerized control system could employ a lane switching operation. In this configuration, the system switches the transition and transit lanes from side to side over time, alternately allowing rider access portals on opposing sides of the guideway to be activated. For example, the computer could activate rider access portals on the north side of a guideway segment and designate the north lane of the guideway as the transition lane, allowing the south lane to serve as the transit lane. In this situation, the rider access portal doors on the south side of the guideway become inoperable. When the waiting vehicle(s) in the north lane leave with their passengers, the computer can then switch the lane configuration in that area, designating the north lane as the transit lane, and the south lane as the transition lane. The north rider access portals would then be inactivated, and the south portals would be activated. Vehicles that have been called for passengers on the south side would then arrive and stop at the appropriate rider access portals on the south side of the guideway, and the appropriate doors would open to allow riders to board the vehicles. Because the closed rider access doors separate riders from the interior of the guideway, riders waiting by inactive rider access portals are protected from danger while the transit lane is adjacent to their portal doors. These passengers simply wait until their side is again designated to be the transition lane and the desired vehicles arrive, and the rider information system provides appropriate information to them while they wait.

The rider access portals 72 can be spaced so as to align with a substantially contiguous "train" of vehicles 84. Thus, a "train" of vehicles that are controllably interconnected as described above can arrive together, and stop so as to align with a series of rider access portals. Because the stopped vehicles are in the transition lane 96, other vehicles not needing to stop at that particular rider station can pass by in the transit lane 94. The message board 82 at each portal 72 can display the name of the destination for the vehicle at that portal, allowing riders to choose the appropriate vehicle. The entire train of vehicles may then leave together, or individual vehicles or subgroups of vehicles may leave at different times. Vehicles diverge from trains as needed along the way to allow each independent vehicle to proceed, without stopping, to its unique destination. Naturally, where there is a destination with a high rider demand, more than one vehicle in a single train may go to that destination. Additionally, the "train" may include vehicles of various sizes.

Demand for the various rider destinations can be gauged at entry gates 98, located at the point of rider access to the rider station 70. The entry gates can include turnstiles, or the like, for counting individual passenger arrivals, and may also include call buttons (79 in FIG. 11) to allow each rider to input their desired destination as they enter. The system can then assign the appropriate number of vehicles to the various destinations, thus maximizing the efficiency of the system. Exit gates 99 can also be included to control egress from the station, to count passenger arrivals, and to verify that riders have disembarked from their associate vehicle(s). Moreover, because rider trips are independent and preferably nonstop, individual rider stations could have separate rider portals for arrivals and departures. This configuration could make oversight of the automatic system easier because it would presume that, whenever a vehicle stops, all riders will exit the vehicle, and any vehicle called by a rider will be empty when it arrives to serve the rider. Automatic systems, such as load sensing suspension systems, motion detectors, etc. can be associated with the vehicles and/or the rider stations to detect these presumed conditions.

It is possible that at some times rider demand may not exist when a vehicle 84 arrives at a given rider station 70 or rider access portal 72. Consequently, the transition lane 96 at any rider access portal (or other location) can function as a staging or waiting point for the independent vehicles. If a vehicle is waiting at a particular portal, and has no assigned destination, the message board 82 may simply be blank. When a rider arrives, either at an entrance gate 98 to a station or at a rider access portal, the rider pushes the appropriate call button 79 on the control panel 80. A vehicle is automatically assigned to the requested destination and sent to the rider access portal, and the message board above the doors can display the destination name or another appropriate message. When the vehicle arrives, the vehicle doors 86 and portal doors 74 open to allow the passenger(s) to enter the waiting vehicle. If no vehicle is present at a particular rider access portal when a rider calls for a vehicle, the system can call the nearest available vehicle, and confirm to the rider that a vehicle is on the way by displaying an appropriate message on the message board.

The speed and configuration of the rider access vehicles can vary. The rider access system can be configured for high speed applications, or could operate at lower speeds. The vehicles that operate on the rider access guideway can be large vehicles that are similar in configuration to city buses. For example, in both FIG. 12A and FIG. 12B, the rider access vehicles 84 are relatively large mass transit-type vehicles, with doors 86 on both sides. Having doors on both sides allows flexibility in the system by allowing rider stations 70 to be located on either side of the guideway, as circumstances require. Alternatively, as shown in FIG. 12C, smaller vehicles 85, such as smaller vans or sedan-type vehicles, can also be used with the rider access portals of the present invention. These larger vehicles may allow riders to sit or stand, at their convenience. Specially configured vehicles can be provided to allow for people traveling with luggage, packages, or other cargo. Small vehicles can also be provided for individuals or small groups, depending on demand or specific rider requests. For example, smaller vehicles that operate more like taxicabs can be used for greater flexibility. These may be more desirable for high speed applications. Because the vehicles normally stay in the guideway, and simply take on or drop off passengers, they can be completely automated, requiring no drivers. This saves labor expense and helps eliminate driver error as a possible source of problems for the system. Alternatively, the vehicles can be configured to leave the guideway and be guided by a driver to a destination off of the guideway, then be returned to the guideway later.

The guideway 76 for the rider access system can be configured in various ways. Two-lane fully-enclosed guideway modules, similar to those shown and described above, can be used. Alternatively, some guideway modules, such as those away from rider stations 70, can be open (i.e. not fully enclosed). Some of the reasons for enclosing the guideways may not apply in all circumstances. For example, where the guideway is elevated or otherwise separated from pedestrians, animals, etc., adequate system safety may not require a full enclosure in all areas. Likewise, for a low speed system, protection from rain or other weather conditions may not be needed. Indeed, even at rider stations, a full enclosure may not be needed. A guideway sidewall 97 with rider access portal doors 74 may be all that is needed to safely separate riders from potential dangers on the guideway. Other safety features may also be desirable. For example, motion detectors and other detection/safety devices (not shown) can be placed near the rider access portal doors both for safety purposes, and to allow a vehicle to wait for approaching passengers. Audible announcements can also be provided at rider stations to help inform and direct riders, as well as to give safety warnings and other important information.

In addition to audible announcements and digital message displays, the rider information system can include other components, and can be two-way. For example, the system can be configured to use personal messaging systems, such as providing information to riders via mobile phones or other portable devices, and to receive information from riders the same way. The system can be configured to allow a rider to call for a vehicle with their mobile phone using voice commands, telephone keypad input, or text messaging. The rider can learn about availability of vehicles, congestion on the system, arrival time of public use vehicles, etc. as well as reserve and pay for use of a vehicle, input a destination, etc. The information system can provide confirmation of a reservation or other relevant information via voice or text messages transmitted back to the rider. Thus, for example, a person working at a particular office building can reserve or summon a vehicle on the guideway using their mobile phone, input the time the vehicle is needed and the desired destination, and have that vehicle waiting for them the moment they arrive at a designated rider access portal. At the same time, the rider information system can inform the rider that a particular portal location is not available, and that the vehicle will arrive at a slightly different time, etc. Many other variations are possible.

The rider access system has many useful applications. One possible application is at airports, where large numbers of people come and go between a variety of common destinations. For example, many airports and associated commercial enterprises include fleets of shuttle buses to move passengers between automobile parking facilities, terminal buildings, auto rental facilities, hotels, bus terminals, taxi waiting areas, other ground transportation etc. In this situation, an automated rider access transit system can provide a ground transport service having a plurality of rider vehicles that independently go to destinations along a guideway at the request of the rider. The system is completely independently flexible. Any vehicle can be assigned to go to any portal and take riders directly to any selected destination associated with the guideway, regardless of the time of day, or the number of riders that desire that destination. Additionally, as noted above, the rider access vehicles can be configured to leave the guideway under the guidance of a driver, allowing the system to take riders to destinations off of the guideway, when needed.

A rider access system as described above can be an integral part of a transit system incorporating any of the features mentioned herein. For example, a transit system in accordance with the present invention can be configured to accommodate a wide variety of types and sizes of vehicles. This can include publicly or privately owned vehicles, some of which stay within the guideway, while others are configured for automatic guidance and control within the guideway, yet are drivable by a driver outside the guideway. Thus, a low speed airport ground transport system can be an integral part of a local or regional general use transit system, allowing specially configured private vehicles, public vehicles, taxis, shuttle buses, city buses, etc. to all use the same guideway or portions of the same guideway at the same time, yet all move smoothly and efficiently to and between their programmed destinations. The destinations could include an exit port leading to a parking garage, a rider access port for taxicabs, or an automated drop-off rider access port from which, after disembarking, the system automatically transports a rider's private vehicle to a parking facility. Upon return to the airport, the rider can call his own vehicle back to a rider access portal for his personal use. Many other configurations are also possible. Such as system could simultaneously enhance safety, security, and efficiency at an airport or other facility.

The rider access system described herein can be a public access system, where riders do not pay for use of the system, or only pay for certain types of use. The airport ground transit system described above is an example of a system that could operate in that way. Alternatively, rider access can be a fee-for-use system, and can be combined with the vehicle access systems described above. For example, rider stations 70 can include toll collection systems interconnected with the vehicle call systems, allowing a rider to pay (or contract to pay) for the use of a vehicle, while simultaneously calling the vehicle to the appropriate rider access portal and designating its destination. The rider can request a private vehicle for himself or a small group, or can indicate a willingness to share a ride with any number of others. For example, viewing FIG. 11, the control panel 80 adjacent to each rider access portal 72 can include a magnetic card reader 81 for allowing a rider to swipe a credit card or the like when calling a vehicle. The control panel 80 can also include an input pad and video screen or other input devices for allowing the rider to input specific travel requests, such as requesting a small vehicle for private travel, entering a travel priority, etc., each request having a corresponding cost. Viewing FIG. 13, the control panel may be located at the entry gates 98, and a card reader or other toll collection system can also be located there (and possibly also at the exit gates 99). Biometric identification or other systems can also be used to ensure security and verify access privileges.

When the desired vehicle arrives, it may be part of a "train" of vehicles, or may be alone. Either way, the rider enters the vehicle and uses it to reach his independently selected destination. The destination could be another rider access station, or it could be a port where the vehicle leaves the guideway under automatic control, allowing the rider to exit the vehicle at some safe stopping point or debarking area within the port. Alternatively, the vehicle may be comparable to a rental car, allowing the user to use the vehicle on the guideway to reach a programmed guideway destination port, then exit the guideway to drive the vehicle to any other desired location. When returned to a port, the rider access vehicle can then reenter the guideway, either with or without passengers.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth in the claims.

What is claimed is:

1. A transit system, comprising:
    a) an elongate guideway, including:
        i. a riding surface, having functionally interchangeable transit and transition lanes;
        ii. a plurality of rider access portals, disposed in a side of the guideway, located at a plurality of destination locations; and
        iii. vehicle access portals, configured to allow vehicles to enter or leave the guideway;
    b) a plurality of autonomous vehicles, disposed within the guideway, configured for transporting riders, the autonomous vehicles having rider entry doors configured to selectively align with any of the rider access portals and allow the riders to enter the vehicle when the autonomous vehicle stops in the guideway adjacent to one of the rider access portals, the transit lane being configured to accommodate the autonomous vehicles traveling at a transit speed, and the transition lane being oriented substantially parallel to the transit lane and located adjacent to the rider access portals, at least some of the autonomous vehicles being configured for independent operation and control by a driver outside of the guideway; and
    c) a control system, configured to
        i. automatically direct one of the plurality of autonomous vehicles along the guideway and to enter the transition lane to stop adjacent to a selected one of the rider access portals in response to a request from one of the riders; and
        ii. automatically guide the one autonomous vehicle along the guideway to a destination location selected by the rider.

2. A transit system in accordance with claim 1, wherein the control system is further configured to (i) combine at least some of the autonomous vehicles into controllably linked "trains" of proximate vehicles for travel in the transit lane, and (ii) independently guide the autonomous vehicles to join and detach from the controllably linked "trains" to allow the autonomous vehicles to travel to independent destination locations.

3. A transit system in accordance with claim 1, wherein the autonomous vehicles draw motive power from the guideway.

4. A transit system in accordance with claim 1, further comprising a toll collection system, associated with the control system, whereby a rider can pay a toll for use of the system when requesting one of the plurality of vehicles and designating a destination.

5. A transit system in accordance with claim 1, wherein at least some of the destination locations further comprise a rider waiting platform, disposed adjacent to at least one of the rider access portals, and a door at the rider access portal, configured to separate the rider from an interior of the guideway except when one of the autonomous vehicles is stopped at the rider access portal.

6. A transit system in accordance with claim 5, wherein the rider waiting platform is level with the riding surface of the guideway, and the autonomous vehicles include stairs to allow riders to climb into the vehicles.

7. A transit system in accordance with claim 5, wherein the rider waiting platform is elevated above the riding surface of the guideway so as to be substantially level with a floor elevation of the autonomous vehicles.

8. A transit system in accordance with claim 1, wherein at least some of the destination locations comprise a rider station, including a rider waiting platform adjacent to at least one of the rider access portals, and a rider information system, configured to convey information to riders regarding the transit system.

9. A transit system in accordance with claim 8, wherein the rider information system comprises components selected from the group consisting of visual displays, audible broadcasts, and personal messaging systems.

10. A transit system in accordance with claim 8, further comprising a rider counting system, associated with the rider station, for gauging rider demand.

11. A transit system in accordance with claim 1, wherein at least a portion of the guideway is substantially enclosed.

12. A transit system, comprising;
    a) an elongate guideway, having a transit lane and a substantially parallel transition lane, the transit and transition lanes being functionally interchangeable, and including vehicle access portals, configured to allow vehicles to enter or leave the guideway;
    b) a plurality of autonomous vehicles, disposed in the guideway and configured to travel therein, at least some of the autonomous vehicles being configured for independent operation and control by a driver outside of the guideway;
    c) a plurality of selectively actuable rider access portals, disposed along the guideway adjacent to a lane of the guideway to be locally and at least temporarily designated as the transition lane, configured to allow ingress and egress of riders to the autonomous vehicles in the guideway; and
    d) a control system, configured to automatically guide the autonomous vehicles within the guideway, to allow the autonomous vehicles to transition between the transit lane and the transition lane, and allow each vehicle to travel between origin and destination locations independently selected by a rider, at least some of the origin and destination locations comprising a rider access station, disposed adjacent to at least one of the selectively actuable rider access portals.

13. A transit system in accordance with claim 12, wherein the guideway comprises a plurality of pre-fabricated modules disposed end-to-end.

14. A transit system in accordance with claim 12, wherein the control system is configured to (i) combine at least some of the plurality of autonomous vehicles into controllably linked "trains" of proximate vehicles for travel in the transit lane, and (ii) independently guide the autonomous vehicles to join and detach from the controllably linked "trains" as needed to accommodate selected ones of the autonomous vehicles beginning at independent origin locations, and destined for independent destination locations.

15. A transit system in accordance with claim 12, wherein the transition lane is configured to (i) allow the autonomous vehicles to stop at selected rider access portals, and (ii) allow the vehicles to accelerate to or decelerate from a transit speed in a transit direction and wherein the transit lane is configured to accommodate the autonomous vehicles traveling at the transit speed in the transit direction.

16. A transit system in accordance with claim 12, further comprising a toll collection system, associated with the control system, configured to allow a rider to pay a toll for use of the system.

17. A transit system, comprising:
    a) an elongate guideway, including:
        i. a riding surface, having functionally interchangeable transit and transition lanes;
        ii. a plurality of rider access portals, disposed in a side of the guideway; and iii. vehicle access portals, configured to allow vehicles to enter or leave the guideway;

b) a plurality of rider stations, each rider station being located adjacent to at least one of the rider access portals;

c) a plurality of autonomous vehicles; disposed within the guideway, configured for transporting riders between the rider access portals, the autonomous vehicles having rider entry doors configured to align with the rider access portals and to allow the riders to enter one of the autonomous vehicles when the one autonomous vehicle stops in the guideway adjacent to one of the rider access portals, at least some of the autonomous vehicles being configured for independent operation and control by a driver outside of the guideway;

d) the transit lane being configured to accommodate the autonomous vehicle traveling at a transit speed, and the transition lane being located adjacent to the rider access portals; and e) a control system, configured to
  (i) automatically direct the one of the plurality of the autonomous vehicles along the guideway to a selected rider access portal in response to a request from a rider, and allow the rider to enter therein; and
  (ii) automatically guide the one autonomous vehicle along the guideway to a destination location selected by the rider, the control system being enable to combine the one autonomous vehicle into a controllably linked "train" with at least one other autonomous vehicle for travel in the transit lane, and to cause the one autonomous vehicle to detach from the controllably linked "trains" of autonomous vehicles, and move to the transition lane to stop at the selected destination.

* * * * *